(12) United States Patent  
Melik-Martirosian

(10) Patent No.: US 9,977,736 B2
(45) Date of Patent: May 22, 2018

(54) OPTIMIZED GARBAGE COLLECTION ALGORITHM TO IMPROVE SOLID STATE DRIVE RELIABILITY

(71) Applicant: HGST Technologies Santa Ana, Inc., Santa Ana, CA (US)

(72) Inventor: Ashot Melik-Martirosian, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days. days.

(21) Appl. No.: 14/798,400

(22) Filed: Jul. 13, 2015

(65) Prior Publication Data

US 2015/0317247 A1  Nov. 5, 2015

Related U.S. Application Data

(63) Continuation of application No. 13/664,335, filed on Oct. 30, 2012, now Pat. No. 9,081,663.

(60) Provisional application No. 61/561,663, filed on Nov. 18, 2011.

(51) Int. Cl.
*G06F 12/02* (2006.01)
*G06F 3/06* (2006.01)

(52) U.S. Cl.
CPC ........ *G06F 12/0253* (2013.01); *G06F 3/0626* (2013.01); *G06F 3/0644* (2013.01); *G06F 3/0689* (2013.01); *G06F 12/0246* (2013.01); *G06F 2212/7205* (2013.01); *G06F 2212/7211* (2013.01)

(58) Field of Classification Search
None
See application file for complete search history.

(56) References Cited

U.S. PATENT DOCUMENTS

| | | | | |
|---|---|---|---|---|
| 5,532,962 | A * | 7/1996 | Auclair | G06F 11/1008 365/184 |
| 7,012,835 | B2 * | 3/2006 | Gonzalez | G06F 11/106 365/185.09 |
| 7,818,525 | B1 * | 10/2010 | Frost | G06F 12/0246 365/185.25 |

(Continued)

OTHER PUBLICATIONS

NAND Flash Solid State Storage for the Enterprise; by Thatcher; SNIA Apr. 2009.*

(Continued)

*Primary Examiner* — Reginald G Bragdon
*Assistant Examiner* — Paul M Knight
(74) *Attorney, Agent, or Firm* — McDermott Will & Emery LLP

(57) ABSTRACT

A method for managing memory operations in a storage device having a plurality of data blocks, the method including steps for determining a number of page reads for each of the plurality of data blocks and determining a dwell time for each of the plurality of data blocks. In certain aspects, the method further includes steps for associating the plurality of data blocks with a plurality of rank groups based on the number of page reads and the dwell time associated with each of the plurality of data blocks and selecting a data block, from among the plurality of data blocks, for memory reclamation based on the associated rank group and the selected data block. A storage system and computer-readable media are also provided.

16 Claims, 7 Drawing Sheets

(56) References Cited

U.S. PATENT DOCUMENTS

| | | | | |
|---|---|---|---|---|
| 2008/0288814 | A1* | 11/2008 | Kitahara | G06F 11/073 714/5.1 |
| 2009/0172254 | A1* | 7/2009 | Chen | G06F 12/0246 711/103 |
| 2009/0193174 | A1* | 7/2009 | Reid | G06F 12/0246 711/100 |
| 2010/0042772 | A1* | 2/2010 | Bonella | G11C 11/5628 711/103 |
| 2010/0115188 | A1* | 5/2010 | Lee | G06F 12/0246 711/103 |
| 2010/0217919 | A1* | 8/2010 | Sukegawa | G06F 12/0246 711/103 |
| 2011/0040932 | A1 | 2/2011 | Frost et al. | |
| 2011/0096601 | A1* | 4/2011 | Gavens | G11C 11/5628 365/185.09 |
| 2011/0225347 | A1* | 9/2011 | Goss | G06F 12/0246 711/103 |
| 2011/0283049 | A1* | 11/2011 | Kang | G06F 12/0246 711/103 |
| 2012/0023144 | A1* | 1/2012 | Rub | G06F 12/0246 707/813 |
| 2012/0030506 | A1* | 2/2012 | Post | G06F 11/008 714/6.1 |
| 2012/0102260 | A1* | 4/2012 | Kawamura | G06F 3/0608 711/103 |
| 2012/0221784 | A1* | 8/2012 | Ban | G06F 12/0246 711/103 |
| 2012/0239990 | A1 | 9/2012 | Mataya et al. | |
| 2013/0007353 | A1* | 1/2013 | Shim | G11C 16/10 711/103 |
| 2013/0091320 | A1* | 4/2013 | Kawamura | G06F 12/0246 711/103 |
| 2013/0132647 | A1 | 5/2013 | Melik-Martirosian | |
| 2013/0159603 | A1* | 6/2013 | Whitney | G06F 12/0246 711/103 |

OTHER PUBLICATIONS

Bit Error Rate in NAND Flash Memories by Mielke; IEEE 2008.*
Novel Read Disturb Failure Mechanism Induced by FLASH Cycling by Brand; IEEE 1993.*
CATA: A Garbage Collection Scheme for Flash Memory File Systems by Han; Springer 2006.*
Han, et al., "CATA: A Garbage Collection Scheme for Flash Memory File Systems," Myongji University and Samsung Advanced Institute of Technology; Sprinter Verlag Heidelberg, 2006, pp. 103-112.
"NAND Flash Solid State Storage for the Enterprise; An In-depth Look at Reliability," Solid State Storage Initiative (SNIA), Apr. 2009, 16 pages.
Mielke, et al., "Bit Error Rate in NAND Flash Memories," IEEE 46th Annual International Physics Reliability Symposium, Phoenix AZ, 2008, pp. 9-19.
Rosenblum, et al., "The Design and Implementation of a Log-Structured File System," ACM Transactions on Computer Systems, vol. 10, No. 1, Feb. 1992, pp. 26-52.

* cited by examiner

OPTIMIZED GARBAGE COLLECTION ALGORITHM TO IMPROVE SOLID STATE DRIVE RELIABILITY

CROSS REFERENCE TO RELATED APPLICATIONS

This application is a continuation of U.S. patent application Ser. No. 13/664,335, entitled "OPTIMIZED GARBAGE COLLECTION ALGORITHM TO IMPROVE SOLID STATE DRIVE RELIABILITY," filed Oct. 30, 2012, which in turn claims the benefit of U.S. Provisional Application No. 61/561,663, entitled "OPTIMIZED GARBAGE COLLECTION ALGORITHM TO IMPROVE SSD RELIABILITY," filed Nov. 18, 2011, both of which are incorporated herein by reference.

BACKGROUND

The subject disclosure relates to solid state memory devices, such as solid-state drives (SSDs). Particularly, the subject disclosure pertains to improved memory reclamation algorithms.

SUMMARY

Although conventional reclaiming algorithms are relatively simple, they typically do not account for memory reliability considerations, which are becoming more relevant in scaled memory devices. In particular, conventional reclaiming algorithms do not take into consideration the limited read disturb and retention characteristics of flash devices, such as, MLC NAND flash devices frequently used in enterprise solid state drive (SSD) applications. The subject technology provides an improved memory reclaiming algorithm (e.g., a "garbage collection algorithm") that overcomes some of the limitations of the existing reclaiming algorithms by taking into consideration reliability limitations. More specifically, aspects of the subject technology take into consideration the limited retention and read disturb characteristics of memory devices, such as MLC NAND Flash, while still maintaining an efficient garbage collection capability.

In certain aspects, the subject technology relates to a method for managing memory operations in a storage device having a plurality of data blocks, the method includes steps for determining a number of page reads for each of the plurality of data blocks and determining a dwell time for each of the plurality of data blocks. In certain aspects, the method further includes steps for associating the plurality of data blocks with a plurality of rank groups based on the number of page reads and the dwell time associated with each of the plurality of data blocks and selecting a data block, from among the plurality of data blocks, for memory reclamation based on the associated rank group of the selected data block.

In another aspect, the subject technology relates to a storage system including a memory, a memory array including a plurality of data blocks, and a controller coupled to the memory and the memory array, where the controller is configured to perform operations for storing, to the memory, a number of page reads associated with each of the plurality of data blocks and storing, to the memory, a dwell time associated with each of the plurality of data blocks. In certain aspects, the controller may be further configured to perform operations for associating the plurality of data blocks with a plurality of rank groups based on the number of page reads and the dwell time associated with each of the plurality of data blocks and selecting a data block, from among the plurality of data blocks, for memory reclamation based on the associated rank group of the selected data block.

In yet another aspect, the subject technology relates to a non-transitory computer-readable storage medium including instructions stored therein, which when executed by a processor, cause the processor to perform operations including determining a number of page reads for each of the plurality of data blocks and determining a dwell time for each of the plurality of data blocks. In certain aspects, the processor may further perform operations for associating the plurality of data blocks with a plurality of rank groups based on the number of page reads and the dwell time associated with each of the plurality of data blocks and selecting a data block, from among the plurality of data blocks, for memory reclamation based on the associated rank group of the selected data block.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details f or the purpose of providing a thorough understanding of the subject technology. However, the subject technology may be practiced without these specific details. In some instances, structures and components are shown in block diagram form in order to avoid obscuring the concepts of the subject technology. Like components are labeled with identical element numbers for ease of understanding.

Figure 1:
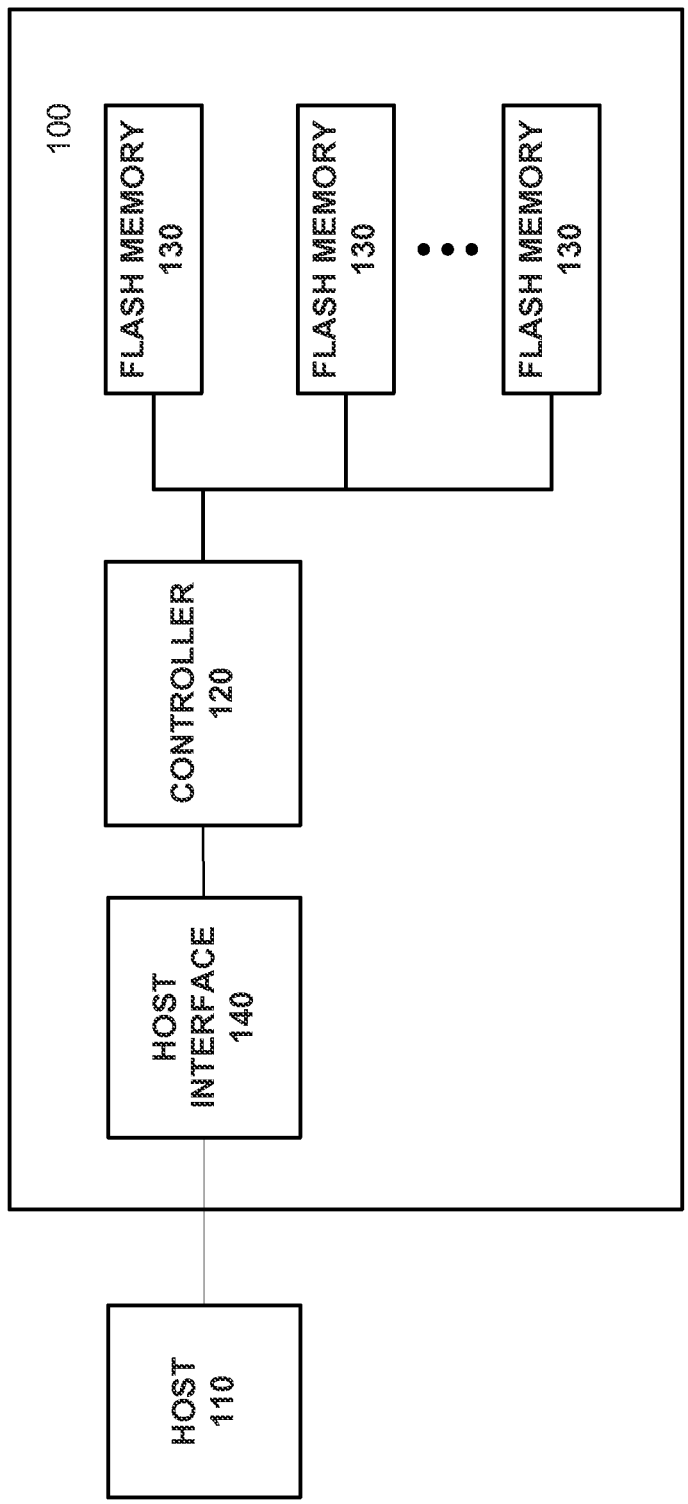
FIG. 1 is a block diagram illustrating components of a flash memory device according to one aspect of the subject technology.

FIG. 1 is a block diagram illustrating components of flash memory device 100 according to one aspect of the subject technology. As depicted in FIG. 1, host 110 is coupled to flash memory device 100 via host interface 140. Flash memory device 100 includes controller 120 and flash memory array 130. Depending on implementation, the elements of flash memory device 100 can be integrated into a single chip or implemented in two or more discrete components.

Controller 120 may be implemented with a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within controller 120. One or more sequences of instructions also may be software stored and read from another storage medium, such as flash memory array 130, or received from a host device (e.g., host 110) via host interface 140. ROMs, storage media, and flash memory arrays represent examples of machine or computer readable media that can store instructions/code executable by the controller. Machine or computer readable media may generally refer to any medium or media used to provide instructions to controller 120, including both volatile media, such as dynamic memory used for storage media or for buffers within controller 120, and non-volatile media, such as electronic media, optical media, and magnetic media.

Host interface 140 may be configured to implement a standard interface, such as Serial-Attached SCSI (SAS), Fiber Channel interface, PCI Express (PCIe), SATA, USB, and the like. Host interface 140 may be configured to implement only one interface. Alternatively, host interface 140 may be configured to implement multiple interfaces, which are individually selectable using a configuration parameter selected by a user or programmed at the time of assembly. Host interface 140 can include one or more buffers for buffering transmissions between a host device and the controller. A host device (e.g., host 110) may be any device configured to be coupled to the data storage system and to store data in data storage system. In some examples, the host device may be a computing system such as a personal computer, a server, a workstation, a laptop computer, PDA, smart phone, and the like. Alternatively, the host device may be an electronic device such as a digital camera, a digital audio player, a digital video recorder or the like.

Flash memory array 130 represents non-volatile memory devices for storing data. By way of example, flash memory array 130 may comprise a single-level cell (SLC) memory, a multi-level cell (MLC) memory or a three-level cell (TLC) memory device. In some aspects, flash memory array 130 may comprise one or more hybrid memory devices that can function in one or more of a SLC, MLC or TLC mode.

Each component of flash memory array 130 can include a single flash memory device or chip, or may include multiple flash memory devices or chips arranged in multiple channels, as depicted in FIG. 1. However, flash memory array 130 is not limited to any particular capacity or configuration.

The flash memory is organized into memory blocks, for example, depending on the flash memory generation. Memory blocks may include different numbers of pages, each of which may have different sizes. Although the number of cell states, the number of memory blocks, the number of physical pages per physical block, the number of sectors per physical page, and the size of the sectors can vary depending on implementation, in some examples, each memory block may consist of 64, 128 or 256 pages, etc. Furthermore, each page may vary in size, for example, 4 kB, 8 kB or 16 kB, etc.

Figure 2A:
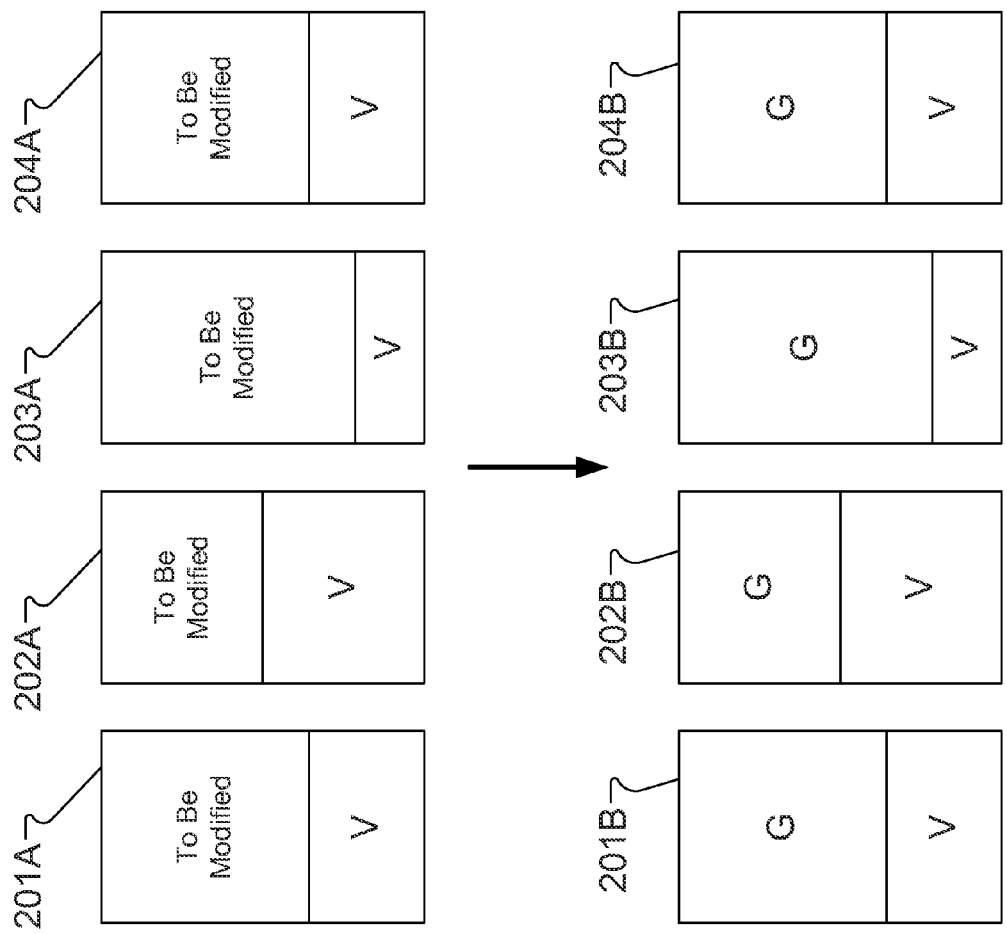
FIGS. 2A, 2B and 2C illustrate examples of a process to erase memory blocks that one or more pages of data to be modified.

FIG. 2A conceptually illustrates an example process for designating content that is to be modified as invalid, or "garbage" data. Specifically, FIG. 2A illustrates memory blocks 201-204, containing differently marked data portions. For example, memory blocks 201A-204A each include one or more pages of valid data (indicated as "V"), as well as one or more pages of data to be modified (indicated "to be modified"). In certain aspects, portions of memory blocks 201A-204A containing data that is to be modified are marked as "garbage," as indicated by corresponding memory blocks 201B-204B. As will be discussed in further detail below, valid data of memory blocks 201B-204B can then be consolidated in a garbage collection procedure in order to produce available erased blocks.

Figure 2B:
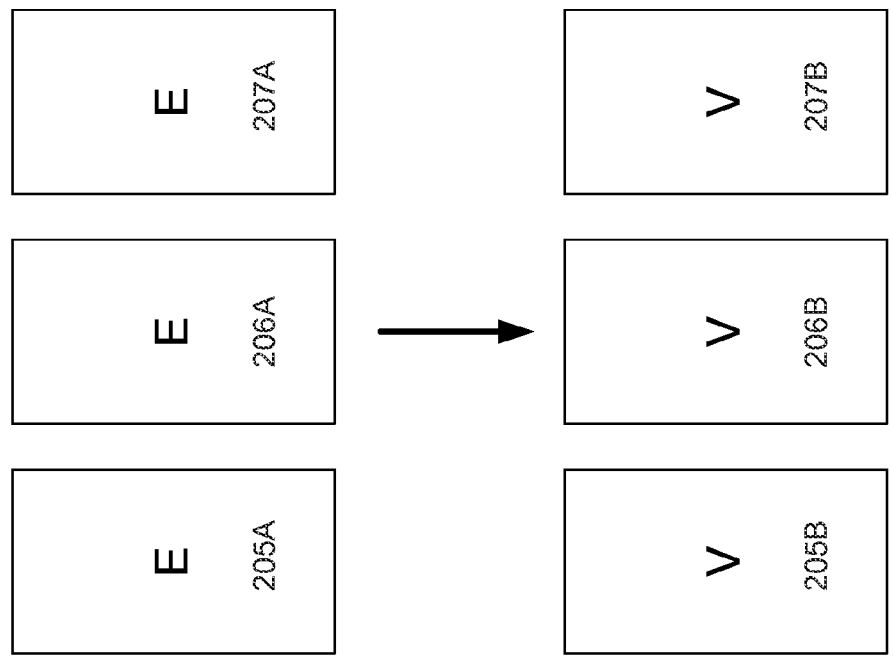

FIG. 2B illustrates available erased blocks 205A-207A that do not contain garbage data and that are available to be written. For example, available erased blocks 205A-207A are available to be written with new content (e.g., valid data), as illustrated by memory blocks 205B-207B.

Figure 2C:
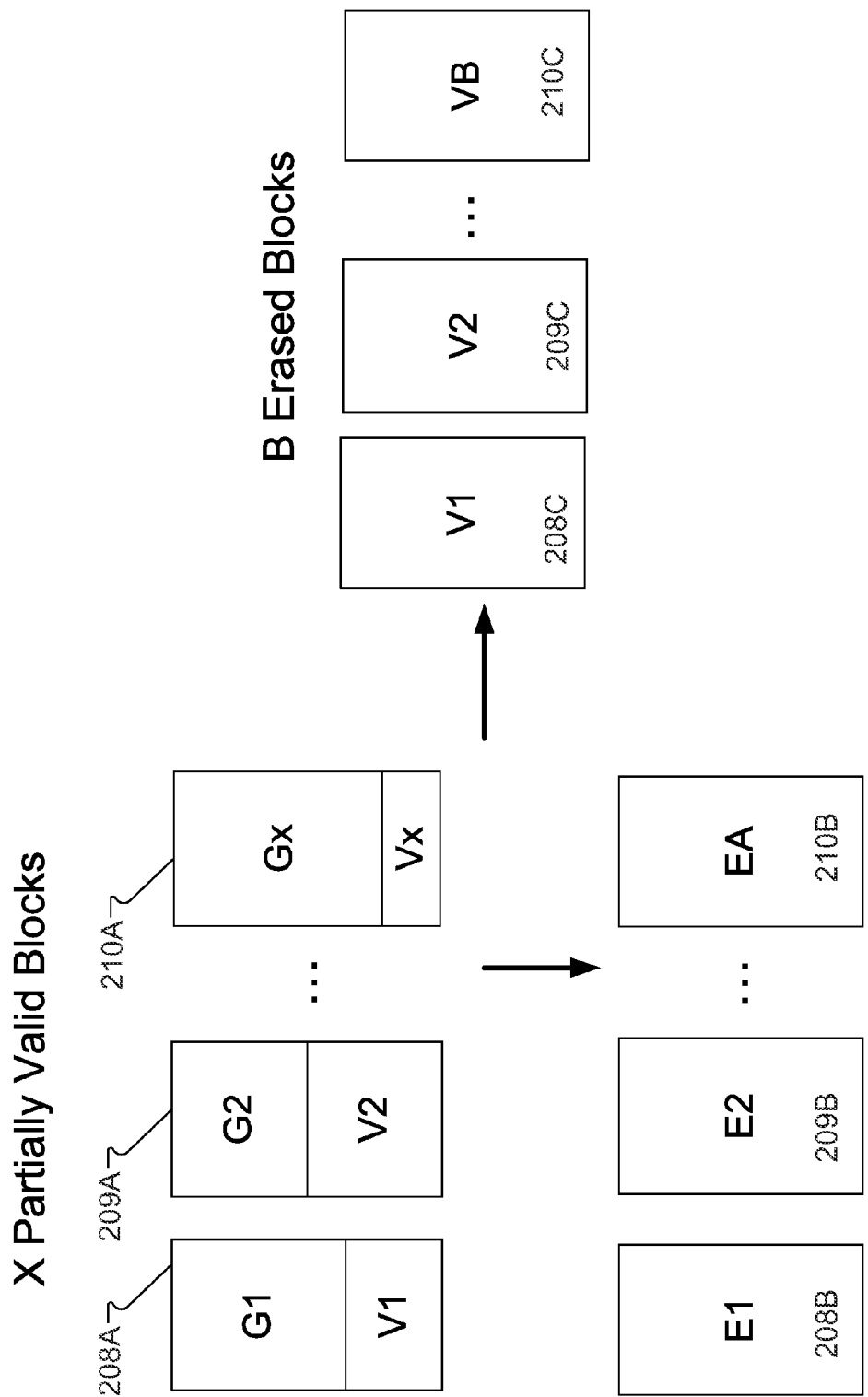

FIG. 2C further illustrates a garbage collection process, which produces B erased blocks out of X partially valid memory blocks. Specifically, FIG. 2C illustrates partially valid memory blocks 208A, 209A and 210A, where partially valid memory block 210A represents the $X^{th}$ memory block in a series of X total partially valid memory blocks. FIG. 2C further illustrates available erased memory blocks 208B, 209B and 210B, wherein available erased memory block 210B represents the $A^{th}$ memory block in a series of A total available erased memory blocks. Similarly, erased memory blocks 208C, 209C and 210C previously represent erased memory blocks now containing valid data, wherein erased memory block 210C represents the $B^{th}$ memory block in a series of B total erased memory blocks.

In certain implementations, a total number of B erased blocks produced by garbage collection process is given by:

$$B=\Sigma_1^X(V_i)/N \qquad (1)$$

where $V_i$ is the number of valid pages in the $i^{th}$ block and N is the total number of pages in the Block. In this example, A blocks are reclaimed where A is given by:

$$A=\Sigma_1^X(G_i)/N \qquad (2)$$

where $G_i$ represents the number of garbage pages in the $i^{th}$ block. Therefore, for every A blocks to be written (e.g., by a host such as host 110), a total of A+B blocks must be written to flash memory, such as flash memory array 130. The ratio of blocks written internally to blocks written by the host is commonly referred to as "write amplification" (WA). In certain aspects, the WA can be given by:

$$WA=(A+B)/A=1+B/A=1+\Sigma_1^X(V_i)/\Sigma_1^X(G_i)=1+V_{ave}/G_{ave} \qquad (3)$$

where $V_{ave}$ and $G_{ave}$ represent average numbers of valid pages and garbage pages across blocks, respectively. Because extra write operations can reduce write performance and consume the limited number of program/erase (P/E) cycles that every memory block can undergo, in certain aspects it is desirable to achieve a WA value as close to 1 as possible, for example, to avoid unnecessary internal write operations for every host operation. In some implementations, it can be difficult to achieve a WA value close to 1. Thus, in certain implementations WA may be larger.

By way of example, WA may range between 2.5 and 4 (with a $V_{ave}/G_{ave}$ in the 1.5 to 2.0 range). Based on formula (3) given above, in order to reduce the WA, it is advantageous to first recycle (e.g., via garbage collection) blocks with the smallest $V_{ave}$ values. Thus, blocks with the lowest $V_i$ and the highest time (since last write) are recycled first. In some implementations, the rationale behind time-indexing the memory blocks is that with the passing of time the host is likely to declare more pages in a given block as "garbage," since new data is constantly written into the SSD.

Although this process accounts for a number of valid pages on a memory block and the time since a block was last written, the process does not take consideration of reliability concerns. In particular, the process does not consider the limited read disturb and retention characteristics of some flash memory devices, for example, MLC NAND flash devices.

Aspects of the subject technology provide an improved garbage collection procedure by taking into consideration reliability concerns through the indexing and ranking of memory blocks. In some implementations, the subject technology provides a method for freeing and consolidating memory in a manner that is based on memory block retention (e.g., data retention) and page read limitations.

As used herein "data retention" refers to the ability of a memory device (e.g., flash memory array 130) to maintain data after a specified time period, at a specified temperature. To achieve higher endurance (e.g., a greater number of P/E cycles), retention should be higher than the combined maximum time that data is stored in a power-down state (e.g., for three months at 40° C.) and the maximum time between memory block writes during memory operation, referred to herein as "dwell time" (DT). A low retention means that the DT must be taken into consideration, because exceeding the maximum allowed DT can result in unreliable read operations and ultimately, in data loss.

Since every read operation on a page in the block has a small detrimental effect on the pages in the same block, another important reliability consideration is the ability to reliably read a memory block after repeated read operations, referred to herein as the "read disturb" (RD) characteristic. As used herein, the RD characteristic of a memory device is defined as the maximum number of block reads after which a reliable read operation may still be performed. By way of example, some memory devices have a RD specification of about 10,000 block reads, after which the data in the block may not be reliably read.

In certain aspects of the subject technology, multiple memory blocks can be indexed according to three independent criteria. First, memory blocks can be indexed according to the number of invalid or garbage pages in the block (G). The value of G may vary with implementation, for example, in certain aspects G can range from 0 to N, wherein N represents the total number of pages in a given block (e.g., N=64 or 128). The value of G may be updated, for example, every time the host (e.g., host 110) declares pages of the block to be garbage.

Second, the memory blocks can be indexed according to the number of page reads (PRD), in the block, since the block was last written. Although the calculation of total page reads can vary with implementation, in some aspects each read performed on any page in a particular block will count as a page read. By way of example, if 100 pages in a block are read one time, and 50 pages are read two times, then the read count would be given by: PRD=100×1+50×2=200. Thus, in certain aspects the PRD can range from 0 (e.g., when the block has just been written), to maximum allowed value, ($PRD_{max}$). In certain aspects, $PRD_{max}$ will be set at, or below, the RD specification value.

Third, memory blocks can be indexed based on a dwell time (DT), for example, relative to a time that the memory block was last written. The DT may be calculated using a timestamp that is saved at the time the block was last written. Earlier timestamp values can correspond to higher DT values, wherein the DT values can range from 0 (e.g., just after the block has been written), to a maximum allowed value ($DT_{max}$). In some implementations, $DT_{max}$ is chosen such that the sum of $DT_{max}$ and the maximum allowed time in the power-down state is equal to, or less than, the retention specification.

In some implementations, memory blocks are ranked using the foregoing criteria. In some examples, the higher the rank of the block, the earlier it is "recycled" by a garbage collection procedure, such as that described above with respect to FIGS. 2A and 2B. In one implementation, threshold values for $PRD_t$ and $DT_t$, can be pre-defined, for PRD and DT indexes, respectively. Based on the values of PRD and DT, memory blocks in a flash memory array (e.g., flash memory array 130) can be associated with one of the following four rank group (RG) levels:

$RG1: PRD \leq PRD_t, DT \leq DT_t$ $RG2: PRD > PRD_t, DT \leq DT_t$ $RG3: PRD \leq PRD_t, DT > DT_t$ $RG4: PRD > PRD_t, DT \leq DT_t$ In certain aspects, $PRD_t$ can be set to a predetermined fraction of the maximum page reads. For example, $PRD_t$ may be set to ½ the maximum page reads. As such, in a flash device with RD of 10,000 block reads and 128 pages per block, $PRD_1$ can be set at ½×10,000×128=640,000. In other implementations, $PRD_t$ may be set more conservatively (e.g., ¼ of max page reads).

Similarly, the time duration value set for $DT_t$ may vary with implementation. For example, $DT_t$ could be set for a specific time duration, such as, 24 hours. However, in a more conservative configuration, $DT_t$ may be set to 12 hrs.

Figure 3:
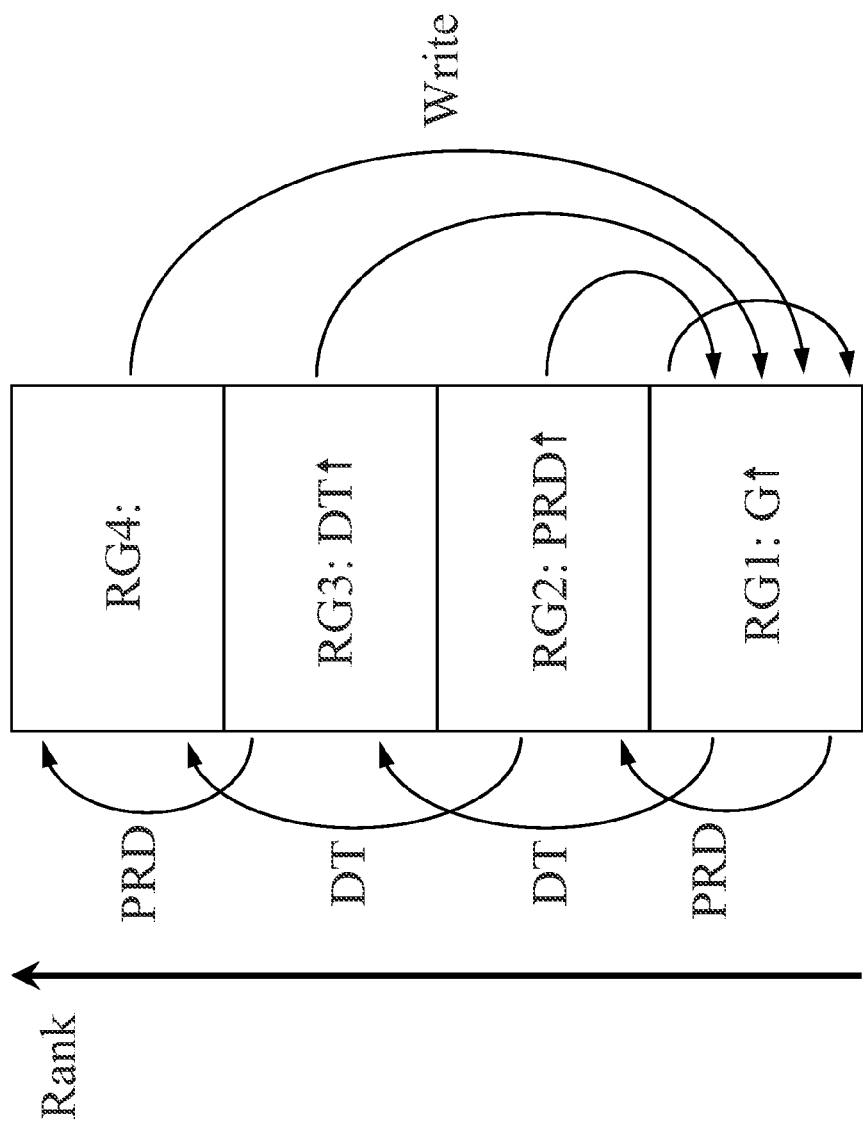
FIG. 3 illustrates an example of the hierarchy of rank group (RG) levels according to some aspects of the subject disclosure.

FIG. 3 illustrates the relative ranking of the four RG levels, according to one example. As illustrated, memory blocks in RG4 are scheduled to be recycled the earliest, followed by the highest ranking memory blocks of RG3 and RG2, respectively.

According to at least one implementation, the movement of memory blocks between RG levels occurs as follows. If PRD in a memory block exceeds $PRD_t$, it is moved from RG1 to RG2 (or from RG3 to RG4). If the DT of the block exceeds $DT_t$, it is moved from RG1 to RG3 (or from RG2 to RG4). When a block is newly written, it is moved from RG2, RG3 or RG4 to RG1 (or moved down in rank within RG1). Thus, more writes (e.g., from the host) can result in memory block movement to RG1, from the other of the RG levels. Additionally, fewer writes (or more reads) can result in movement from RG1 to RG2, RG3, or RG4.

Within every individual RG level, blocks may be ranked based on different criteria. In certain aspects, RG1 blocks can be ranked based on a number of pages containing garbage data. For example, blocks with a higher G have a higher ranking, as illustrated in FIG. 3.

In RG2, blocks can be ranked based on a value of PRD. That is, higher PRD values may be associated with a higher rank. In certain aspects, if any particular memory block in RG2 reaches $PRD=PRD_{max}$, the data in the memory block may be immediately relocated, irrespective of its current rank. That is, data from the memory block can be written into a different block, as shown in FIG. 3.

In RG3, blocks are ranked based on DT. That is, higher values of DT are associated with a higher rank. If any particular block in this group reaches $DT=DT_{max}$, the data in the memory block is immediately relocated, irrespective of its current rank, e.g., the data from this block is read and written into a different memory block, as indicated in FIG. 3.

In RG4, memory blocks can be ranked by the sum of PRD and DT (PRD+DT). If any memory block in this group reaches $PRD=PRD_{max}$ or $DT=DT_{max}$, the data in the memory block is immediately relocated, irrespective of its current rank. That is, the data from the memory block is read and written into a different block, as indicated in FIG. 3.

In some examples, garbage collection can be performed on all flash memory blocks containing user data. However, in some implementations, blocks containing system data (e.g., tables, logs, etc.) will be exempted from garbage collection.

Figure 4:
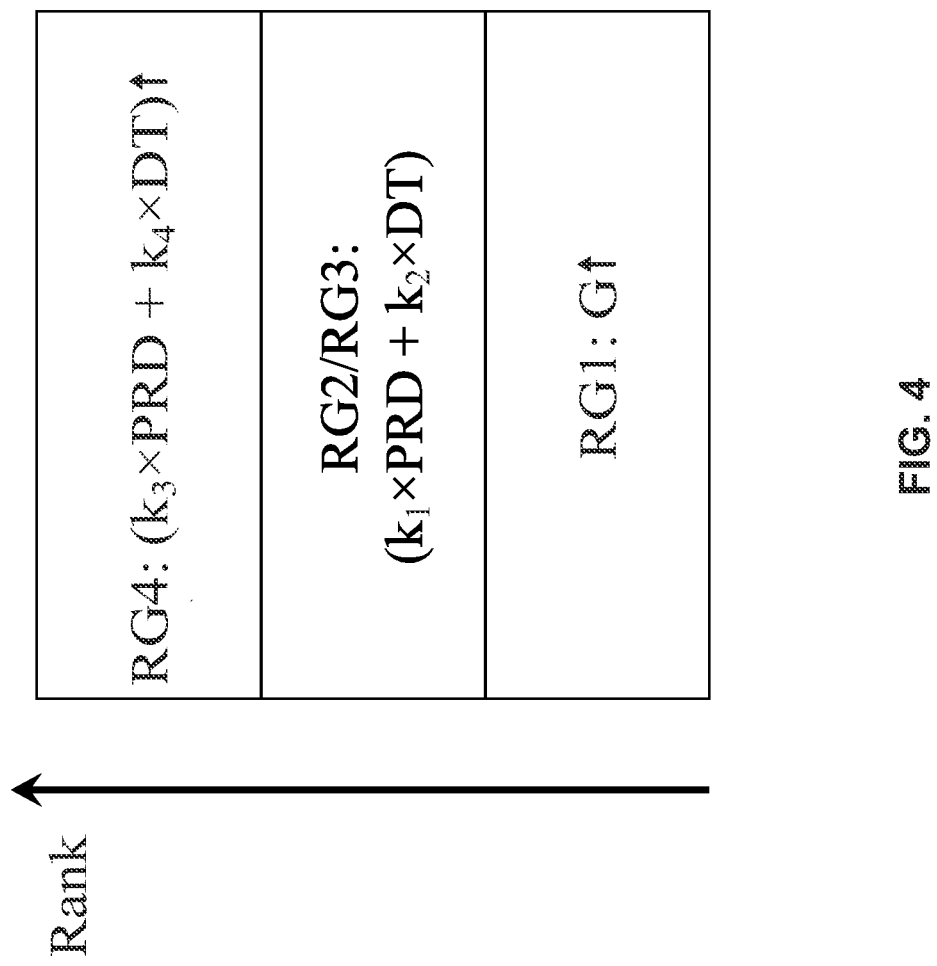
FIG. 4 illustrates an example of the hierarchy of RG levels according to some aspects of the subject disclosure.

FIG. 4 illustrates another example ranking for RG levels. Specifically, in the example of FIG. 4, RG2 and RG3 are combined and RG1 blocks are ranked, within the RG1 level, based on a number of garbage pages. For example, in RG1 memory blocks with a greater number of "garbage" pages (e.g., higher G values) are given a higher ranking. As further illustrated in FIG. 4, RG2 and RG3 blocks are ranked by the value of a weighted sum of PRD and DT, given by: ($k_1 \times$ PRD+$k_2 \times$DT), where $k_1$ and $k_2$ are weight coefficients, which can be chosen to prioritize either PRD or DT, as needed. Similarly, RG4 blocks are also ranked by the value of a weighted sum of PRD and DT, given by: ($k_3 \times$PRD+ $k_4 \times$DT). By way of example, weighting coefficients $k_1$, $k_2$, $k_3$ and $k_4$ may be designated as various integer values based on the read disturb and retention characteristics of the corresponding memory device.

In certain aspects, weight coefficients $k_1$, $k_2$, $k_3$ and $k_4$ may be modified and/or updated at different times, for example, different phases of the memory lifecycle. In some aspects, coefficients may be adjusted based on a periodically measured bit error rate (BER), and once the BER reaches a certain threshold, the coefficients can be appropriately increased such that ranking priority is increased for the same PRD/DT. Additionally, $PRD_t$ and $DT_t$ can be decreased when a certain BER threshold is reached. In some examples, this may also increase ranking priority for the same PRD/DT by forcing memory blocks to a higher priority RG level.

If any particular block in RG2, RG3, or RG4 reaches $PRD=PRD_{max}$ or $DT=DT_{max}$, the data in the block is relocated irrespective of its current rank, e.g., the data from this block is read and written into a different block.

It is understood that the foregoing ranking functions with respect to the RG1, RG2, RG3 and RG4 levels are examples of ranking functions based on read disturb and retention characteristics of a memory device. However, other ranking functions are possible, depending on the desired implementation.

In yet another aspect of the subject technology, values of $PRD_t$ and $DT_t$ may be chosen such that when a large amount of data is written to the corresponding memory device, a majority of blocks belonging to RG1, RG2, RG3, or RG4 are empty most of the time. In this example, since the blocks are being constantly re-written at high rate, there will be almost no blocks that require recycling based on DT or PRD (because after recycling a block both DT and PRD are reset to zero), and the maximum amount of newly erased space is recovered for every recycled block.

On the other hand, when a small amount of data is written to the memory device, the number of blocks in RG2, RG3, and RG4 will increase, and the blocks may be recycled based only on DT and/or PRD, thus keeping the drive operating reliably. In both examples, if PRD or DT in a given block reach their respective limits (e.g., $PRD_{max}$ and $DT_{max}$), the corresponding memory block is immediately relocated to ensure that no excessive PRD or DT are allowed.

Figure 5:
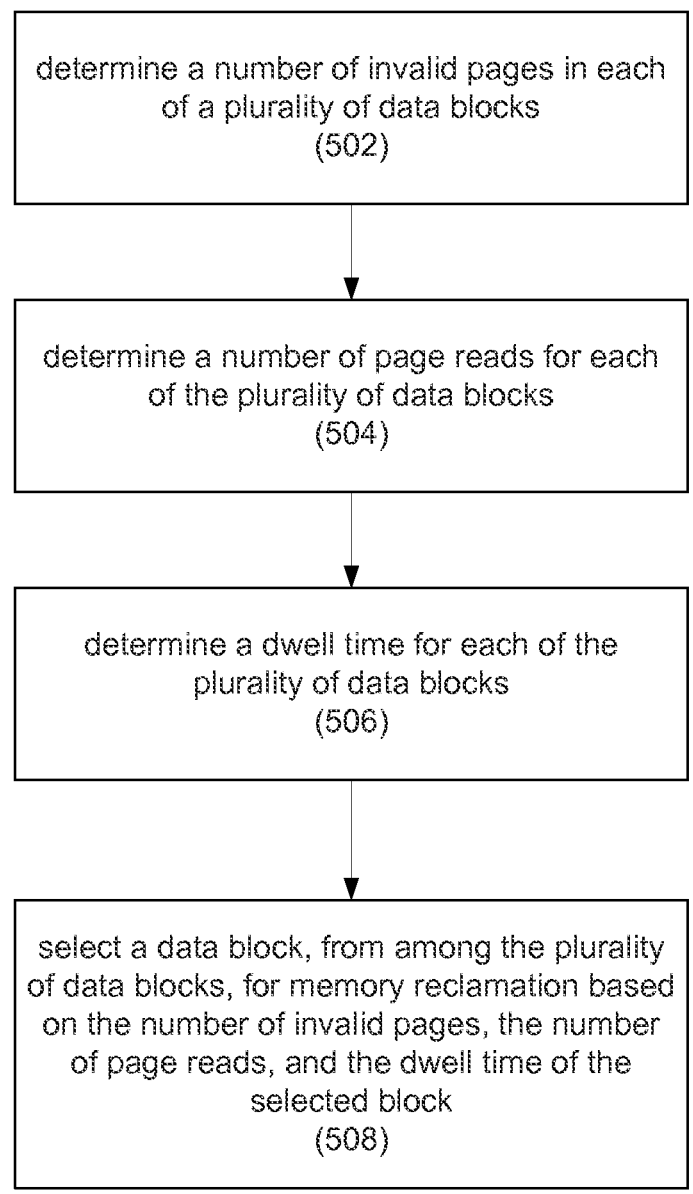
FIG. 5 illustrates an example of a write procedure performed to produce erased blocks out of blocks containing garbage data.

FIG. 5 illustrates an example of a write procedure 500 that can be performed to produce erased memory blocks out of memory blocks containing garbage data. The procedure 500 begins with step 502 in which a number of invalid pages across multiple data blocks is determined. Although any type of data stored to pages of a memory block may be designated as invalid, in certain implementations invalid data may correspond with data that has (or will be) updated and/or modified. In other implementations, invalid data may include corrupted or irrecoverable data stored to one or more pages in a memory device (e.g., flash memory array 130).

In step 504, a number of page reads for each of a multitude of data blocks is determined. As discussed above, a number of page reads (PRD) may be determined with respect to a specific duration of time (e.g., the number of page reads in a given time period), or with respect to a specific operation (e.g., the number of page reads may be tolled since a block was last written). Although the calculation used to determine the PRD may vary with implementation, in one example the PRD for a particular block may be calculated based on a number of times each page within the block is read. For example, if 100 pages in the block were read one time, and 50 pages were read two times, then read count would be given by: $PRD=100\times1+50\times2=200$.

In step 506, a dwell time for each of the multitude of data blocks is determined. The dwell time (DT) for a given data block may be tolled from various times, depending on implementation. As discussed above, the DT for a data block may be measured based on an amount of time that has elapsed since data was last written to the data block. In certain implementations, the DT for a particular data block may be reset (e.g., set to zero) each time the block is moved between RG levels.

In step 508, a data block is selected, from among the multitude of data blocks, for memory reclamation based on the number of invalid pages, the number of page reads and the dwell time of the selected data block. As discussed above, the selection of a data block for memory reclamation (e.g., for erasure) can be based on the associated RG level of the data block, which is based on measures the number of invalid pages, the number of page reads and the dwell time of the data block.

Thus, the subject technology provides an improved garbage collection process based on reliability considerations, e.g., based on PRD and DT. For example, in some implementations, as soon as a given block moves from RG1 to either RG2, (e.g., because $PRD>PRD_t$), or to RG3 (because $DT>DT_t$), reliability considerations prevail over the consideration to recover a maximum amount of newly erased space f or every recycled block.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is presented as an illustration of some exemplary approaches. Based upon design preferences and/or other considerations, it is understood that the specific order or hierarchy of steps in the processes can be rearranged. For example, in some implementations some of the steps can be performed simultaneously. Thus the accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A method for managing memory operations in a storage device having a plurality of data blocks, the method comprising:
   determining a number of page reads for each of the plurality of data blocks;
   determining a dwell time for each of the plurality of data blocks;
   associating the plurality of data blocks with a plurality of rank groups based on the number of page reads and the dwell time associated with each of the plurality of data blocks,
   wherein, for each of the plurality of data blocks associated with a first rank group of the plurality of rank groups, the respective number of page reads is less than or equal to a threshold value for the number of page reads and the respective dwell time is less than or equal to a threshold value for the dwell time,
   wherein, for each of the plurality of data blocks associated with a second rank group of the plurality of rank groups, the respective number of page reads exceeds the threshold value for the number of page reads and the respective dwell time is less than or equal to the threshold value for dwell time,
   wherein, for each of the plurality of data blocks associated with a third rank group of the plurality of rank groups, the respective number of page reads is less than or equal to the threshold value for the number of page reads and the respective dwell time exceeds the threshold value for dwell time, and
   wherein for each of the plurality of data blocks associated with a fourth rank group of the plurality of rank groups, the respective number of page reads exceeds the threshold value for the number of page reads and the respective dwell time exceeds the threshold value for dwell time; and
   selecting a data block, from among the plurality of data blocks, for memory reclamation based on the associated rank group of the selected data block, wherein the data block is selected from a highest rank group of the plurality of rank groups having an associated data block.

2. The method of claim 1, further comprising:
   determining a number of invalid pages in each of the plurality of data blocks; and
   ranking each of the plurality of data blocks within the associated plurality of rank groups based on one or more of the number of page reads, dwell time, or number of invalid pages,
   wherein selecting the data block is further based on the ranking within the associated rank group of the selected data block.

3. The method of claim 1, further comprising:
   ranking each of the plurality of data blocks within the associated plurality of rank groups, wherein ranking each rank group of the plurality of rank groups is based on a set of criteria different from respective sets of criteria used for ranking within the other rank groups of the plurality of rank groups,
   wherein selecting the data block is further based on the ranking within the associated rank group of the selected data block.

4. The method of claim 3, wherein ranking each of the plurality of data blocks comprises:
   ranking each data block of the plurality of data blocks that is associated with the second rank group based on the number of page reads of the data block; and
   ranking each data block of the plurality of data blocks that is associated with the third rank group based on the dwell time of the data block.

5. The method of claim 3, further comprising:
   determining a number of invalid pages in each of the plurality of data blocks,
   wherein ranking each data block of the plurality of data blocks comprises:
      ranking each data block of the plurality of data blocks that is associated with the first rank group of the plurality of rank groups based on the number of invalid pages of the data block.

6. The method of claim 3, wherein ranking each data block of the plurality of data blocks comprises ranking each data block of the plurality of data blocks that is associated with the fourth rank group based on a sum of at least the number of page reads and the dwell time of the data block.

7. A storage system, comprising:
   a memory;
   a memory array comprising a plurality of data blocks; and
   a controller coupled to the memory and the memory array, wherein the controller is configured to perform operations for:
      storing, to the memory, a number of page reads associated with each of the plurality of data blocks;
      storing, to the memory, a dwell time associated with each of the plurality of data blocks;
      associating the plurality of data blocks with a plurality of rank groups based on the number of page reads and the dwell time associated with each of the plurality of data blocks,
      wherein, for each of the plurality of data blocks associated with a first rank group of the plurality of rank groups, the respective number of page reads is less than or equal to a threshold value for the number of page reads and the respective dwell time is less than or equal to a threshold value for the dwell time,
      wherein, for each of the plurality of data blocks associated with a second rank group of the plurality of rank groups, the respective number of page reads exceeds the threshold value for the number of page reads and the respective dwell time is less than or equal to the threshold value for dwell time,
      wherein, for each of the plurality of data blocks associated with a third rank group of the plurality of rank groups, the respective number of page reads is less than or equal to the threshold value for the number of page reads and the respective dwell time exceeds the threshold value for dwell time, and
      wherein for each of the plurality of data blocks associated with a fourth rank group of the plurality of rank groups, the respective number of page reads exceeds the threshold value for the number of page reads and the respective dwell time exceeds the threshold value for dwell time; and
      selecting a data block, from among the plurality of data blocks, for memory reclamation based on the associated rank group of the selected data block, wherein the data block is selected from a highest rank group of the plurality of rank groups having an associated data block.

8. The storage system of claim 7, wherein the controller is further configured to perform operations comprising:
   storing, to the memory, a number of invalid pages associated with each of the plurality of data blocks; and
   ranking each of the plurality of data blocks within the associated plurality of rank groups based on one or more of the number of page reads, dwell time, or number of invalid pages,
   wherein selecting the data block is further based on the ranking within the associated rank group of the selected data block.

9. The storage system of claim 7, wherein the controller is further configured to perform operations comprising:
   ranking each of the plurality of data blocks within the associated plurality of rank groups, wherein ranking within each rank group of the plurality of rank groups is based on a set of criteria different from respective sets of criteria used for ranking within the other rank groups of the plurality of rank groups,
   wherein selecting the data block is further based on the ranking within the associated rank group of the selected data block.

10. The storage system of claim 9, wherein ranking each of the plurality of data blocks comprises:
    ranking each data block of the plurality of data blocks that is associated with the second rank group based on the number of page reads associated with the data block; and
    ranking each data block of the plurality of data blocks that is associated with the third rank group based on the dwell time associated with the data block.

11. The storage system of claim 9, wherein the controller is further configured to perform operations comprising:
    determining a number of invalid pages associated with each of the plurality of data blocks,
    wherein ranking each data block of the plurality of data blocks comprises:
       ranking each data block of the plurality of data blocks that is associated with the first rank group of the plurality of rank groups based on the number of invalid pages of the data block.

12. The storage system of claim 9, wherein ranking each data block of the plurality of data blocks comprises ranking each data block of the plurality of data blocks that is associated with the fourth rank group based on a sum of at least the number of page reads and the dwell time associated with the data block.

13. A non-transitory computer-readable storage medium comprising instructions stored therein, which when executed by a processor, cause the processor to perform operations comprising:
    determining a number of page reads for each of a plurality of data blocks;
    determining a dwell time for each of the plurality of data blocks;
    associating the plurality of data blocks with a plurality of rank groups based on the number of page reads and the dwell time associated with each of the plurality of data blocks,
    wherein, for each of the plurality of data blocks associated with a first rank group of the plurality of rank groups, the respective number of page reads is less than or equal to a threshold value for the number of page reads and the respective dwell time is less than or equal to a threshold value for the dwell time,
    wherein, for each of the plurality of data blocks associated with a second rank group of the plurality of rank groups, the respective number of page reads exceeds the threshold value for the number of page reads and the respective dwell time is less than or equal to the threshold value for dwell time, wherein, for each of the plurality of data blocks associated with a third rank group of the plurality of rank groups, the respective number of page reads is less than or equal to the threshold value for the number of page reads and the respective dwell time exceeds the threshold value for dwell time, and wherein for each of the plurality of data blocks associated with a fourth rank group of the plurality of rank groups, the respective number of page reads exceeds the threshold value for the number of page reads and the respective dwell time exceeds the threshold value for dwell time; and selecting a data block, from among the plurality of data blocks, for memory reclamation based on the associated rank group of the selected data block, wherein the data block is selected from a highest rank group of the plurality of rank groups having an associated data block.

14. The non-transitory computer-readable storage medium of claim 13, wherein the operations further comprise:

ranking each of the plurality of data blocks within the associated plurality of rank groups, wherein ranking within each rank group of the plurality of rank groups is based on a set of criteria different from respective sets of criteria used for ranking within the other rank groups of the plurality of rank groups, wherein selecting the data block is further based on the ranking within the associated rank group of the selected data block.

15. The non-transitory computer-readable storage medium of claim 14, wherein ranking each of the plurality of data blocks comprises:

ranking each data block of the plurality of data blocks that is associated with the third rank group based on the dwell time of the data block; and ranking each data block of the plurality of data blocks that is associated with the second rank group based on the number of page reads of the data block.

16. The non-transitory computer-readable storage medium of claim 14, wherein the operations further comprise:

determining a number of invalid pages in each of the plurality of data blocks, wherein ranking each data block of the plurality of data blocks comprises:

ranking each data block of the plurality of data blocks that is associated with the first rank group of the plurality of rank groups based on the number of invalid pages of the data block.

* * * * *